United States Patent [19]
van Raay

[11] 3,765,320

[45] Oct. 16, 1973

[54] ONION END CUTTER
[75] Inventor: Albertus van Raay, Ulft, Netherlands
[73] Assignee: N. V. Machinenfabrik Finis, Ulft, Netherlands
[22] Filed: Jan. 11, 1971
[21] Appl. No.: 105,239

[30] Foreign Application Priority Data
Jan. 23, 1970  Netherlands...................... 7000942

[52] U.S. Cl. ............................................... 99/636
[51] Int. Cl. ........................................... A23n 15/04
[58] Field of Search...................... 146/81 R, 83, 84, 146/85; 99/636

[56] References Cited
UNITED STATES PATENTS

| | | | |
|---|---|---|---|
| 3,186,459 | 6/1965 | Van Raay | 146/83 |
| 3,126,930 | 3/1964 | Vosti et al. | 146/83 |
| 3,402,748 | 9/1968 | Olney | 146/83 X |
| 3,515,193 | 6/1970 | Aguilar | 146/83 X |
| 3,621,900 | 11/1971 | Rood | 146/83 |
| 3,623,524 | 11/1971 | Buck | 146/83 |

FOREIGN PATENTS OR APPLICATIONS
650,653  2/1951  Great Britain........................ 146/83

*Primary Examiner*—Willie G. Abercrombie
*Attorney*—Spensley, Horn and Lubitz

[57] ABSTRACT

A device for topping and tailing crops, particularly onions, said device comprising a conveyor belt for feeding the bulbs arranged in openings of the conveyor belt and at least one topping and tailing member arranged above and beneath the conveyor belt, said members being displaceable in a direction normal to the conveyor belt in order to occupy a desired position relative to the bulbs for removing the heads and tails of the bulbs and including feelers cooperating with the bulbs and limiting the displacement of the topping and tailing members in said normal direction, wherein the feelers detect only the greatest distances over which the bulbs project above and beneath the belt and accordingly control the movements of the topping and tailing members relative to the bulbs.

14 Claims, 6 Drawing Figures

ONION END CUTTER

BACKGROUND OF THE INVENTION

I. Field of the Invention

The invention relates to a device for topping and tailing crops, particularly onions, said device comprising a conveyor belt for feeding the bulbs arranged in openings of the conveyor belt and at least one topping and one tailing member arranged above and beneath the belt, respectively, said members being displaceable normal to the conveyor belt in order to occupy a desired position relative to the bulbs for removing the tops and tails from the bulbs and including feelers cooperating with the bulbs to limit the movements of the topping and tailing members in such normal direction.

II. Description of the Prior Art

A known device of the kind set forth comprises annular feelers which come into contact with the bulbs for limiting the movements of the topping and tailing members. Although this known device, in general, operates satisfactorily, it may in some cases be disadvantageous that the height at which the tops and the tails are cut depends upon the shape of the bulbs, since, for example, in the event of a much elongated bulb, the feeler can slip further on the bulb before it rests thereon than in the event of a more spherical bulb. Consequently, measured in a direction normal to the circumference of portions of the conveyor belt larger tops and tails will be cut from elongated bulbs than from more spherical bulbs.

SUMMARY OF THE INVENTION

The invention has for its object to provide a construction of the kind set forth, in which the foregoing disadvantage of the known device does not occur.

According to the invention this can be achieved by causing the feelers to detect the extremities of the bulbs projecting beneath and above the belt and to accordingly control the movements of the topping and tailing members.

A particularly simple device can be obtained by using such a structure of the feeler that is located centrally above and beneath an opening in the conveyor belt during the topping and tailing operations. The topping and tailing member is preferably formed by a flat knife, which is adpated to move beneath and above the feeler, respectively.

BRIEF DESCRIPTION OF THE DRAWINGS

The invention will now be described more fully with reference to a construction embodying the invention.

DESCRIPTION OF THE PREFERRED EMBODIMENTS

Figure 1:
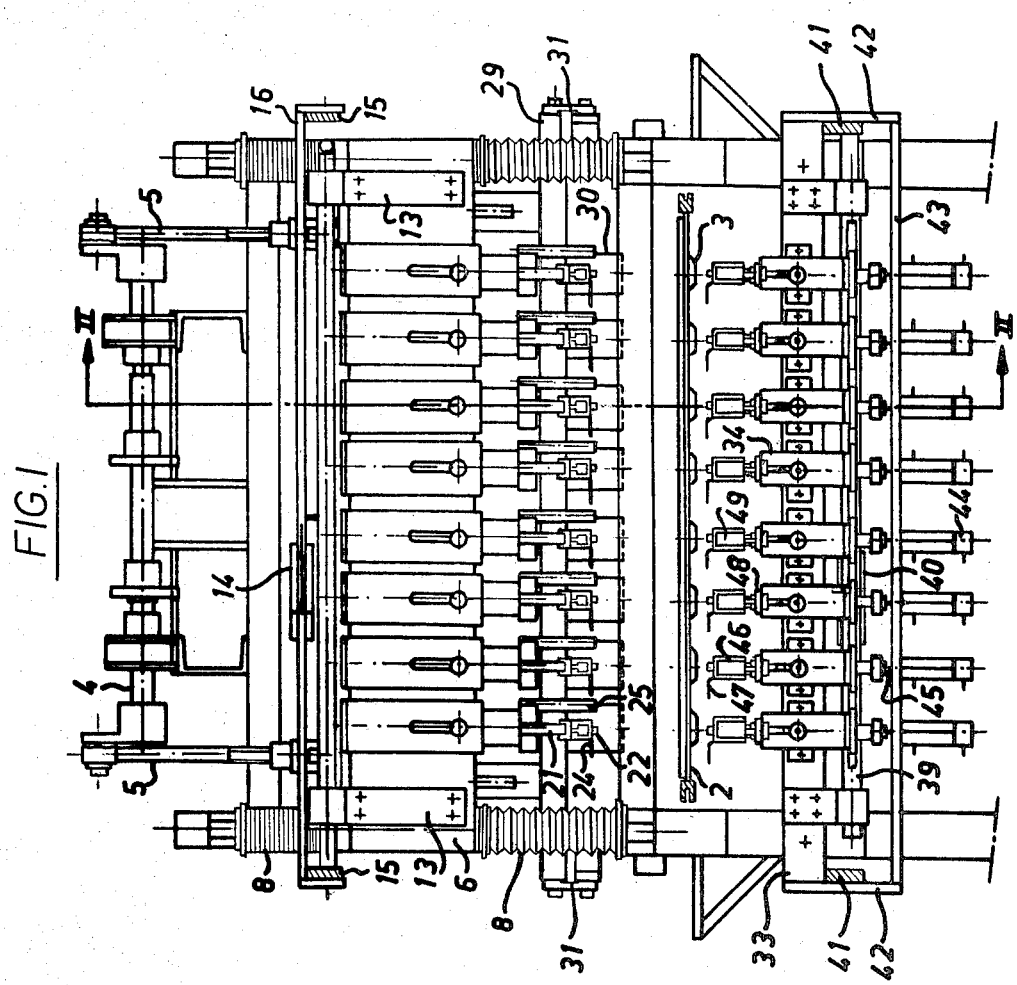
FIG. 1 is a cross-sectional view of a device in accordance with the invention.
Figure 2:
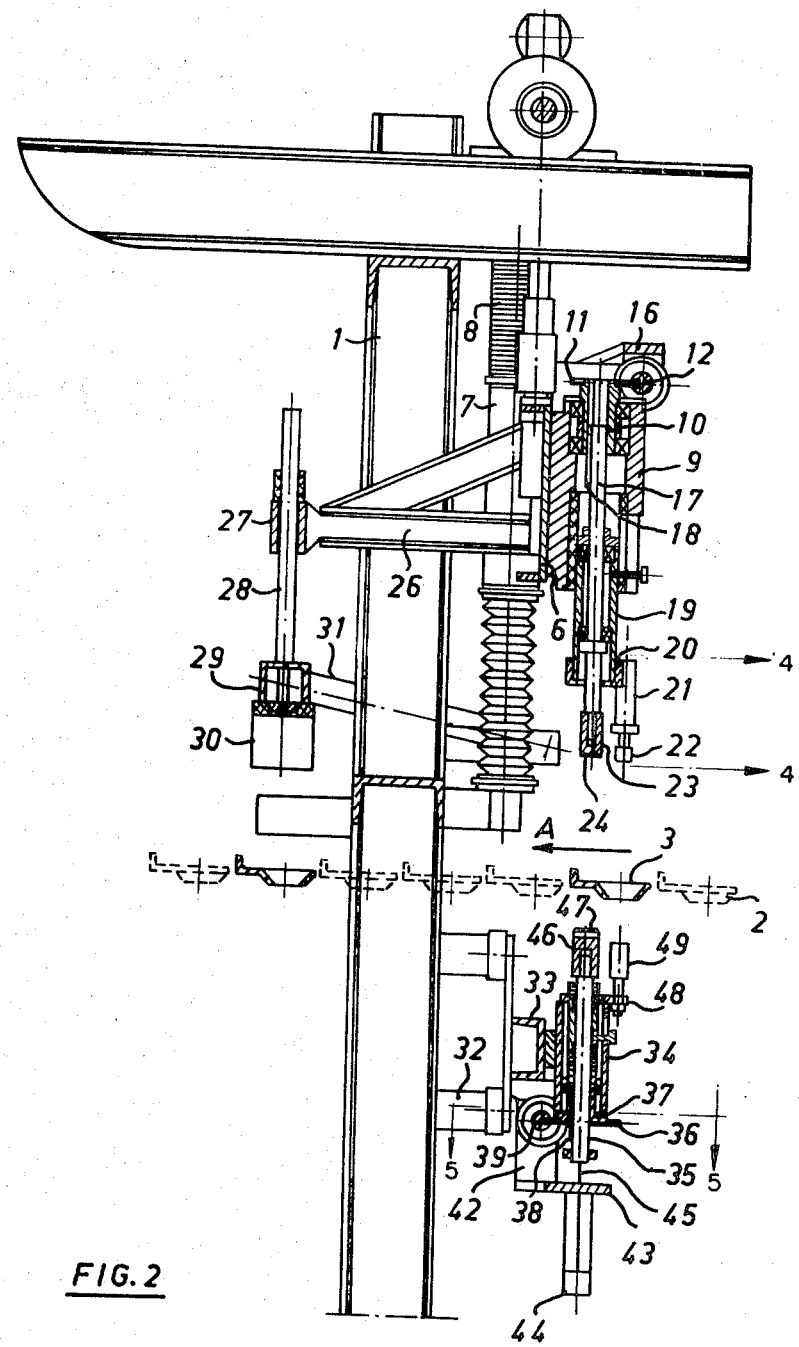
FIG. 2 is a sectional view taken on the line II—II in FIG. 1.

The device shown in FIGS. 1 and 2 comprises a frame 1, in which an endless conveyor belt 2 is journalled to move intermittently in operation in the direction of the arrow A. It will be apparent from the Figure that the conveyor belt 2 is provided with rows of adjacent cup-shaped openings 3 succeeding each other in the direction A.

Near the topside of the frame 1, a crank shaft 4 is journalled in the frame and is driven by a motor (not shown). The crank shaft 4 is coupled by means including connecting rods 5 with a vertical plate 6, extending at right angles to the direction of movement of the conveyor belt 2. To the ends of the plate 6, sleeves 7 are secured and adapted to slide along vertical shafts, secured to the frame and surrounded not only by the sleeves 7, but also by elastic screening sockets 8 located beneath and above the sleeves.

A plurality of housings 9 are secured to the plate 6. Sleeves 10 are rotatably arranged in the top ends of the housings and gear wheels 11 are secured to the top ends of the sleeves 10, the teeth of which gear wheels mesh with a toothed rack forming part of a shaft 12. The shaft 12 is displaceable in its direction of length in supports 13, secured to the plate 6. The shaft 12 is adapted to reciprocate in its direction of length by means of a pneumatic cylinder 14, secured to the plate 6 and coupled with the shaft 12 by connector 14a. The movements of the shaft 12 are limited by stops 15, provided at both ends of the shaft 12 and connected with a support 16 which is coupled with the plate 6.

Figure 4:
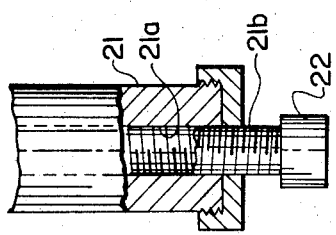
FIG. 4 is a cross-sectional view, with parts in elevation, taken on the line 4—4 of FIG. 2.

In the sleeve 10 is slideably journalled the top end of a vertical shaft 17, while the sleeve 10 and the shaft 17 are secured against relative rotation by a wedge 18. The shaft 17 is also journalled in a sleeve 19, which is displaceable together with the shaft 17 in an axial direction in the housing 9. The lower side of the sleeve 19 is closed by a lid 20, to which a feeler 21 is secured. The lower end 22 of the feeler together with the further part of the feeler is displaceable, for example, by a screw joint, parallel to the direction of length of the shaft 17 which can be set in a plurality of positions. As shown in FIG. 4, feeler 21 at its lower end is provided with an internal screw thread 21a, the feeler end 22 having a threaded shaft 21b which is in engagement therewith: a locking cap is provided to secure end 22 in adjusted position. To the lower end of the shaft 17 is secured a sleeve 23, to which a topping member is secured, which is formed by a knife 24, which extends normally to the longitudinal direction of the shaft 17. The sleeve 23 with the knife 24 is preferably secured to the lower end of the shaft 17 so that with respect to the longitudinal direction of the shaft 17, the knife 24 is displaceable and fixable in a plurality of positions. It will be seen from the Figures that the knife is located on a lower level than the lower side of the lower end 22 of the feeler 21. Apart from the feeler 21 each lid 20 has secured to it a further feeler 25, the lower end of which is located on a lower level than the knife 24.

To the plate 6 are also secured supports 26, extending rearwardly away from the plate 6 and provided at the rear with eyelets 27, through which air supply ducts 28 are passed. The air supply ducts 28 communicate with cup-shaped nozzles 30, secured to a supporting beam 29 which extends transversely of the longitudinal direction of the conveyor belt 2. To the ends of the supporting beam 29 are pivoted the ends of the guide rods 31, as shown at 31a, the other ends of which are pivoted to the frame as shown at 31b.

From FIGS. 1 and 2 it will be seen that the number of adjacent knives 24, connected to the plate 6, and the number of cup-shaped nozzles 30 located behind the knives, viewed in the direction of movement indicated by the arrow A, correspond with the number of cup-shaped openings in the belt 2 located in one row. Measured in the direction of movement of the belt the distance between a feeler 21 and a cup-shaped nozzle 30 is such that the feeler 21 and the nozzle 30 are simultaneously located above cup-shaped recesses 3 in the conveyor belt 2.

Figure 5:
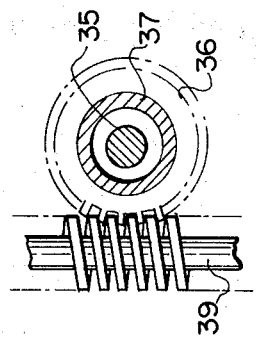
FIG. 5 is a view taken on line 5—5 of FIG. 2.

Beneath the conveyor belt 2 a beam 33, extending transversely of the direction of movement of the belt, is secured by means of supports 32 to the frame. Housings 34 are secured to the beam 33. In each housing, shafts 35, axially aligned with the shafts 17, are slideably journalled in their direction of length in a manner similar to the shafts 17 in the housings 9. As shown in FIGS. 2 and 5, the shafts 35 can also be caused to rotate by means of a gear wheel 36, secured to the lower end of a sleeve 37, journalled in the housing 34 and coupled by means of a wedge 38 with the shaft 35. The gear wheels 36 of the various shafts 35 are in mesh with a toothed rack forming part of a shaft 39, extending parallel to the beam 33. The shaft 39, like the shaft 12, is adapted to reciprocate between stops 44 secured to the beam 33 by means of a setting cylinder 40 which is, coupled with the shaft 39. By means of arms 42, a horizontal plate 43 is connected with the beam 33. The lower side of the plate 43 is provided with a plurality of setting cylinders 44, the piston rods 45 of which are connected with the lower ends of the shafts 35.

The top end of each shaft 35 is provided with a sleeve 46, to which a knife 47 is secured at right angles to the rotary axis of the associated shaft 35. The knife may be connected with the shaft 35 so that with respect to the shaft 35, the knife 47 is displaceable in the direction of length of the shaft and can be fixed in a plurality of positions. With the shaft 35 is furthermore connected a plate 48, which is adapted to move up and down together with the shaft 35. The plate 48 has secured to it a feeler 49, which extends parallel to the shaft 35 and which is adapted to be set parallel to the shaft 35 and to be fixed in a plurality of positions. It will be seen from the Figures that the plane of rotation of the knife 47 is located above the top end of the feeler 49.

Figure 6:
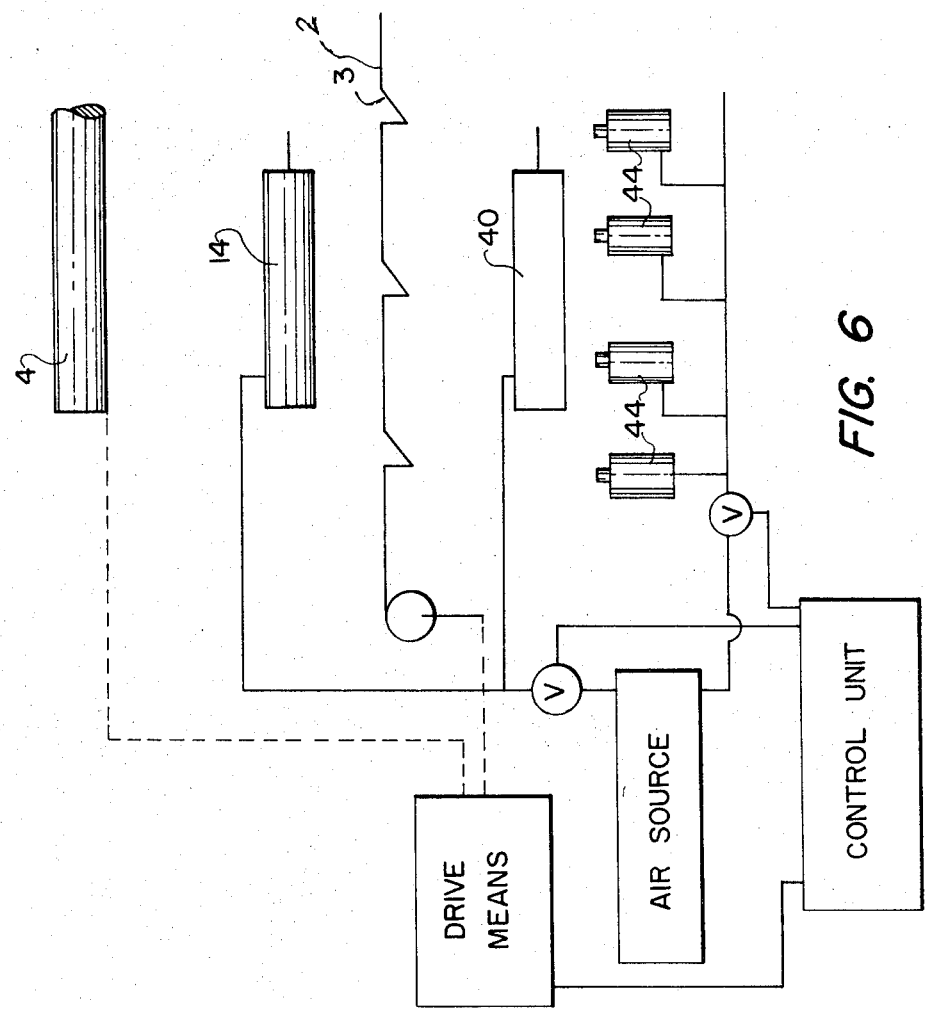
FIG. 6 is a schematic view illustrating the actuating and control means of the device.

FIG. 6 illustrates schematically a drive means connected to a sprocket for the conveyor belt 2 and to the crank shaft 4, controlled by a suitable control unit. An air source supplies air under pressure to the pneumatic cylinders 14, 40 and 44, as shown, suitable valves being placed in the lines and controlled by the control unit.

The machine described above operates as follows:

The crop to be topped and tailed, for example, onions, is placed in the cup-shaped openings 3 and the belt 2 is moved intermittently in the direction of the arrow A. At the instant when the center of a cup-shaped opening is located on the center lines of the feelers 21 and 49 located above and beneath the belt respectively, the belt will stop. By means of the crank shaft 4 and the connecting rods 5, the plate 6 holding the housings 9 will then be moved downwardly or normally with respect to the belt. Both movements are caused by the drive means under control of the control unit. During this downward movement the lower end 22 of the feeler 21 will come into contact at a given instant with the top side of, for example, an onion so that the onion is urged against the belt by the feeler, after which, the feeler and the knife 24 coupled therewith, can no longer move further downwardly. If the plate 6 has then not yet reached the end of its stroke, the sleeve 19 holding the shaft 17 will shift in place relatively to the housing 9.

At the same time, the shafts 35 are urged upwardly with the aid of the pneumatic cylinders 44 until the feeler 49 comes into contact with the end of the onion, or the like, projecting beneath the belt: air is supplied to the cylinders 44 from the air source. The air pressure actuating the pneumatic cylinders 44 is adjustable and is set in this case so that the bulb is not pressed upwardly against the weight of the parts of the device bearing on the top of the bulb. As soon as the onions lying on one row are clamped tight between the proximal ends of the feelers 21 and 49, the shafts 12 and 39 are displaced in their longitudinal direction so that the knives 24 and 27 are caused to rotate so that the tops and the tails, respectively, are cut off. It will be obvious that the knives then rotate about axes located at a distance from, or eccentric to, the center of the cup-shaped opening 3 holding the bulb worked by said knives. By adjusting the differences in height between the free ends of the feelers 21 and 49 and the knives 24 and 47, the size of the portions to be cut can be determined. After the portions are cut off, the knives with the associated parts will again move upwardly and downwardly, respectively, and the belt 2 will perform another step, after which the whole cycle is repeated.

It will furthermore be obvious that simultaneously with the downward movement of the upper knives 24, the cup-shaped nozzles are moved downwardly. The cup-shaped nozzles are then located above onions whose tops and tails have been cut off. As soon as the cup-shaped nozzles 30 are near the belt 2, compressed air is admitted via the duct 28 in order to blow away the scales of onions.

The feelers 25 prevent the knives 24 from coming into contact with the belt.

It will be obvious that independently of the shape of the onions, the cutting planes of the knives across the onions are always at the same distances from the top side and the bottom side, respectively, of the onion concerned.

Figure 3:
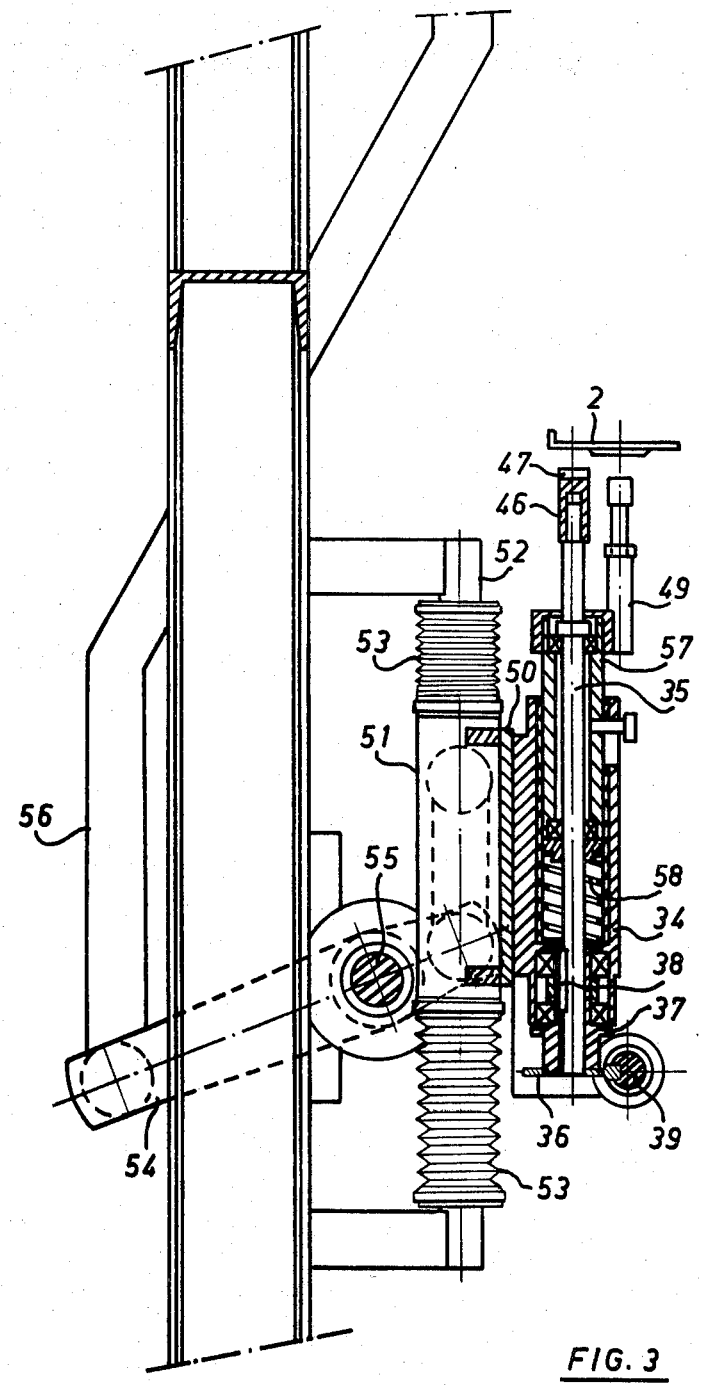
FIG. 3 shows part of a variant of the device in accordance with the invention.

It will be obvious that the device may be constructed in various ways. FIG. 3 shows, for example, a driving mechanism for the upward and downward movement of the lower knives, if no air pressure is used for this purpose. The parts similar to those of the preceding embodiment are designated by the same reference numerals. The housings 34, accommodating the shaft 35 of the knives 47 are secured in this case to a plate 50. The ends of the plate 50 are secured to sleeves 51, which are displaceable along shafts 52, secured to the frame. The parts of the shafts located above and beneath the sleeves are surrounded at least for the major part by flexible protecting sockets 53. The sleeves 51 have coupled with them the ends of the levers 54, which are adapted to turn about a shaft 55, journalled in the frame. The ends of the levers 54 remote from the sleeves 51 are pivoted to coupling rods 56, which connect the levers 54 with the up and downwardly movable supporting part of the upper knife 24.

In this embodiment each shaft 35 is journalled in a sleeve 57, which is displaceable in the housing 34 against the action of a spring 58. Consequently, when the feeler 49 comes into contact with the end of an onion or a similar bulb projecting beneath the belt, the knife 47, cooperating with the relevant feeler 49, will be moved downwardly with the shaft 35 holding said knife with respect to a housing 34 against the action of the spring 58 during a further upward movement of the plate 50 with the housings 34 secured thereto.

A simplified embodiment can be obtained by causing all lower knives to occupy a fixed position relative to the mechanism by means of which the knives can be moved up and downwardly with respect to the belt 2, the construction being chosen to be such that the onions lying in one row are urged upwardly by the lower feelers against the action of the forces exerted by the upper feelers on the onions, until the lower ends of the onions project all over the same distance beneath the belt. Then the lower and upper ends of the onions or similar crop bulbs can be cut off.

I claim:

1. A device for topping and tailing a bulb crop, particularly onions, comprising in combination:
   a. a conveyor device having open bottomed means for supporting bulbs therein;
   b. at least one topping member and one tailing member, each comprising a flat knife and a shaft, each said knife disposed on and transversely of a said shaft, each shaft being eccentric to the center of said bulb-holding means, means for effecting planar rotation of said topping members and means for effecting movement thereof normal to said conveyor device on opposite sides of said conveyor device;
   c. a feeler member for each of said topping member and said tailing member, means connecting each said feeler member to a said topping member and a said tailing member for movement therewith normal to the conveyor and for positioning an opposed pair of said feeler members centrally above and beneath, respectively, an open-bottomed means in said conveyor device, whereby during the topping and tailing operation said feeler members in opposed pairs contact the maximum extremities of said bulbs from opposite sides of said conveyor device and thereupon limit further travel of each of said topping member and tailing member, the amount of crop topped and tailed from said bulb being determined with respect to the maximum normal dimension of said bulb relative to said conveyor device.

2. A device as claimed in claim 1, wherein each of said feeler members is adjustable in a direction normal to said conveyor device and can be fixed in a plurality of positions.

3. A device as claimed in claim 1, a plurality of housings each holding a said shaft, wherein said shaft of a topping or tailing member is axially displacable in its direction of length in said housing which is constructed to reciprocate in operation by means of a driving mechanism, the movement of said shaft in said housing being controlled by means of said feeler member.

4. A device as claimed in claim 1, wherein said topping or tailing member is constructed for reciprocal motion in a direction normal to the longitudinal direction of said conveyor device with the aid of a pneumatic cylinder, the stroke of which is determined by said feeler member.

5. A device as claimed in claim 4, wherein said topping or tailing member located on one side of said conveyor device is journally affixed within said housing for reciprocal motion in operation, and said topping or tailing member located on the other side of said conveyor device is adapted for reciprocal motion with the aid of pneumatic cylinder, whereby under the action of the weight of the part of said topping or tailing member adapted to shift relatively to said reciprocatory housing, said bulb is urged against said conveyor device, the air pressure in said pneumatic cylinder being such that said bulb cannot be lifted from said conveyor device with the aid of said pneumatic cylinder.

6. A device as claimed in claim 3, wherein said topping and tailing members located beneath and above said conveyor device, respectively, are displaceably journalled in relatively coupled housings in a direction normal to the direction of length of said conveyor device; said housings being reciprocally moveable in operation in a direction normal to the direction of length of said conveyor device.

7. A device as claimed in claim 1, wherein said topping or tailing member located on one side of said conveyor device is adapted to reciprocate in operation over a fixed distance transversely of the direction of length of said conveyor device so that, in operation, the end of said member projecting on said side is constantly lifted until it projects over a given distance on said side of said conveyor belt.

8. A device as claimed in claim 1, wherein on each side of said conveyor device a plurality of adjacent topping and tailing members are arranged, which are caused to rotate by means of a toothed rack displaceable transversely of the direction of length of said conveyor device and cooperate with gear wheels connected with said topping and tailing members.

9. A device as claimed in claim 8, wherein said toothed rack is adapted to reciprocate with the aid of a setting cylinder.

10. A device as claimed in claim 1, and further including means for blowing away the scales of the topped or tailed crop.

11. A device as claimed in claim 10, wherein said blowing means together with said housings of the topping or tailing members located above said conveyor device are constructed for reciprocal motion.

12. A device as claimed in claim 10, wherein said means for blowing off said scales are provided with cup-shaped members to be placed over the crop, into which compressed air is blown.

13. A device as claimed in claim 4, wherein said topping or tailing member located on one side of said conveyor device is journalled in said housing adapted to reciprocate in operation, and said topping or tailing member located on the other side of said conveyor device reciprocates with the aid of a pneumatic cylinder, whereby under the action of the weight of the part of said topping or tailing member adapted to shift relatively to said reciprocatory housing, the crop is urged against said conveyor device, the adjustment of the air pressure in said cylinder being such that said crop cannot be lifted from said conveyor device with the aid of said pneumatic cylinder.

14. A device as claimed in claim 12, wherein said means for blowing off said scales are provided with cup-shaped members to be placed over said crop, into which compressed air is blown.

* * * * *